United States Patent [19]
Held

[11] 3,711,999
[45] Jan. 23, 1973

[54] SELF-AIR COOLING ABRADING WHEEL

[76] Inventor: Gerhard R. Held, 22644 Shiell Drive, Mt. Clemens, Mich. 48043

[22] Filed: Feb. 1, 1971

[21] Appl. No.: 111,272

Related U.S. Application Data

[63] Continuation-in-part of Ser. No. 841,439, July 14, 1969, Pat. No. 3,579,928.

[52] U.S. Cl. ................................................51/206 R
[51] Int. Cl. ................................................B24d 5/10
[58] Field of Search .......51/204, 206 R, 206 P, 72 R, 51/356, 266–267; 125/15

[56] References Cited

UNITED STATES PATENTS

| | | | |
|---|---|---|---|
| 2,811,960 | 11/1957 | Fessel | 125/15 |
| 875,935 | 1/1908 | Landis | 51/206 P |
| 2,049,874 | 8/1936 | Sherk | 51/206 P |
| 2,755,601 | 7/1956 | Lux | 51/206 R |
| 3,420,010 | 1/1969 | Tobey | 51/206 R X |
| 3,406,489 | 10/1968 | Harris | 51/72 R X |

FOREIGN PATENTS OR APPLICATIONS

| | | | |
|---|---|---|---|
| 523,879 | 7/1940 | Great Britain | 51/206 P |

Primary Examiner—Donald G. Kelly
Attorney—Cullen, Settle, Sloman & Cantor

[57] ABSTRACT

A monolithic abrading wheel having edge notches of such a size, shape and location as to function as air scoops, to scoop air from the atmosphere at the sides of the wheel into the notches and outlet such air at the face of the wheel for cooling at the wheel face.

1 Claim, 17 Drawing Figures

INVENTOR
GERHARD R. HELD

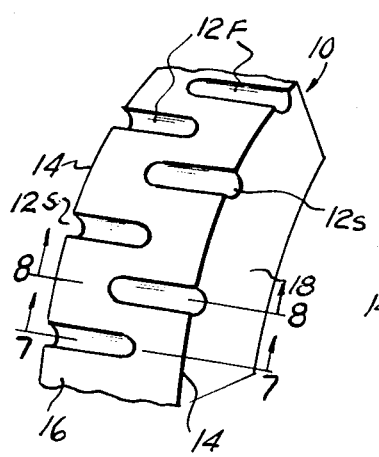
FIG.6
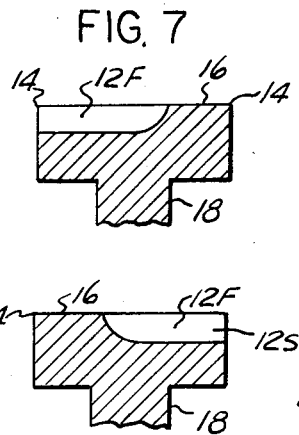
FIG.7
FIG.8
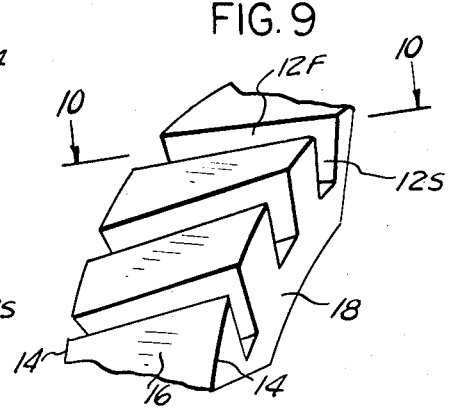
FIG.9
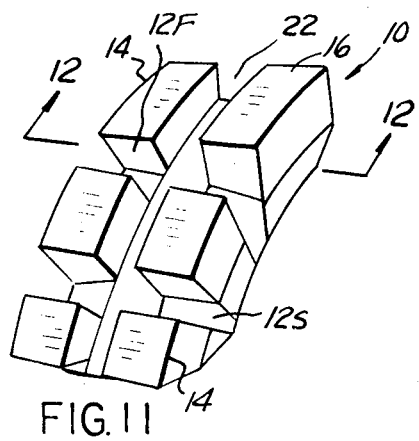
FIG.11
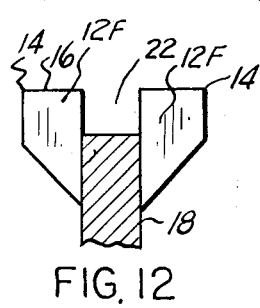
FIG.12
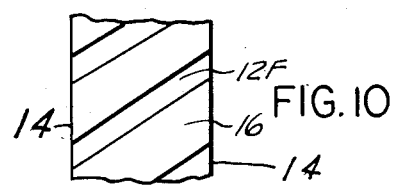
FIG.10
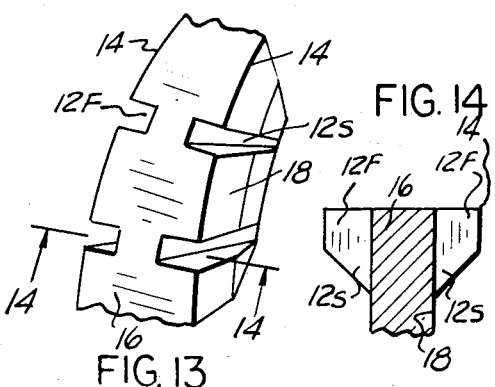
FIG.13
FIG.14
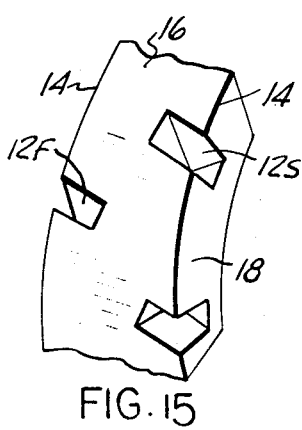
FIG.15
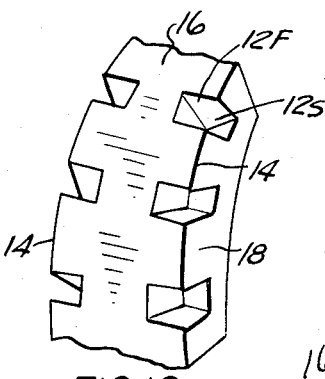
FIG.16
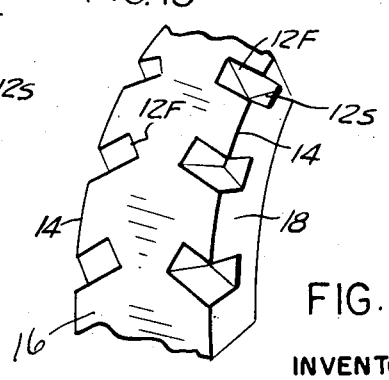
FIG.17
INVENTOR
GERHARD R. HELD

3,711,999

SELF-AIR COOLING ABRADING WHEEL

CROSS REFERENCE

This application is a continuation-in-part of my prior application Ser. No. 841,439, filed July 14, 1969 now U.S. Pat. No. 3,579,928 dated May 25, 1971.

BACKGROUND

In certain grinding operations employing abrading wheels excessive friction develops with excessive heating unless some practical means is provided for effecting a cooling at the wheel face.

It has been known to provide cooling means such as is disclosed in a U.S. Pat. to Harris No. 3,406,489 of Oct. 22, 1968, where side plates are attached to the sides of the wheel and are formed with inlets and outlets for air for cooling the wheel at the side surfaces. It also has been contemplated to provide air jets or other attachments to the wheel for cooling. It is possible that other arrangements are also known.

BRIEF DESCRIPTION

A primary object of the invention hereof is to form an abrading wheel in such a manner that the air cooling action is effected without the aid of attachments. Attachments can work loose during the operation of the wheel and cause damage and annoyance. By my invention the air cooling is effected without the use of attachments. Instead a monolithic wheel is provided and is itself formed with notches for air scooping and air cooling effects.

A variety of forms of notches have been contemplated and are disclosed in the appended drawings; in these drawings:

FIG. 6 shows a third embodiment;

Figure 2:
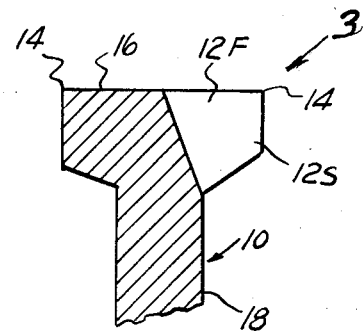
FIG. 2 is a fragmentary transverse section as if on line 2—2 of FIG. 1.

FIGS. 7 and 8 are transverse section views as if on lines 7—7 and 8—8 of FIG. 6;

FIG. 9 shows still another embodiment;

FIG. 10 is a plan view as if on line 10—10 of FIG. 9;

FIG. 11 shows still another modification;

FIG. 12 is a transverse section view as if on line 12—12 of FIG. 11;

FIGS. 13, 15, 16 and 17 show additional modifications.

FIG. 14 is a transverse section view as if on line 14—14 of FIG. 13.

THE BASIC WHEEL

All of the figures of the drawings show a monolithic abrading wheel of conventional form in general equipped with the improvements hereof characterized as a series of notches 12 on one or both annular edges 14, such edges defining the intersections of the abrading wheel face 16 and the wheel sides 18. The notches 12 open to both the wheel face 16 and a wheel side 18.

Since each notch has a face part and a side part reference numerals 12f will be employed to designate the face part of the notch 12 and 12s will be employed to designate the side part of the notch 12.

On wheel rotation each notch 12 will serve as an air scoop to scoop air from the atmosphere at the side of wheel into the side part 12s of the notch 12 and outlet it through the face of the wheel, out from the face part 12f of the notch.

The various modifications shown in the drawings all employ the basic concept heretofore described but vary in accordance with variations in the style and arrangement of the notches.

Figure 1:
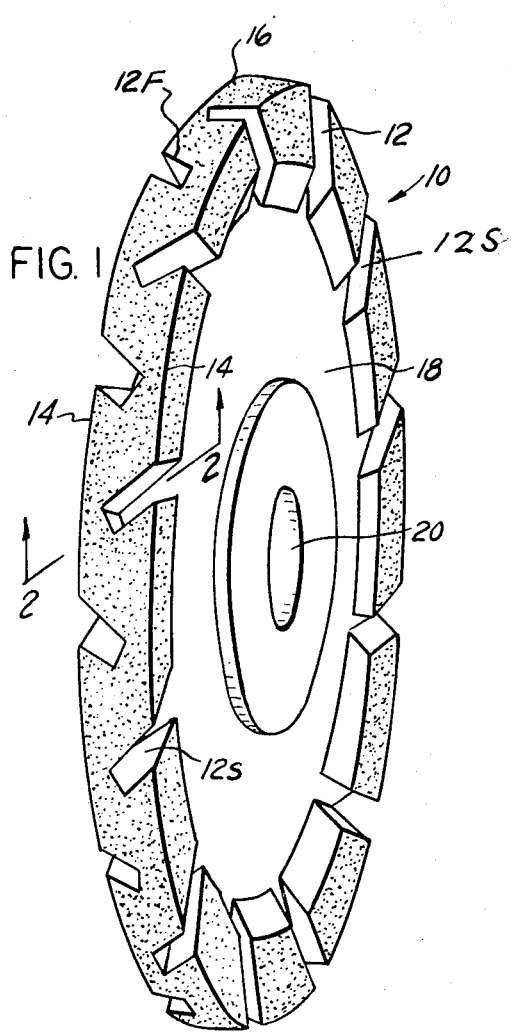
FIG. 1 is a perspective view of a monolithic abrading wheel with one embodiment of such notches.
Figure 3:
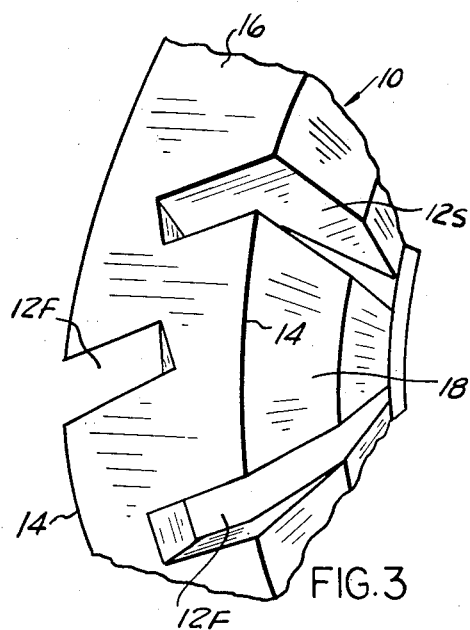
FIG. 3 is an enlarged fragmentary perspective view as if in the direction of the arrow 3 of FIG. 2.

Thus, as shown in FIG. 1 and elsewhere the side parts 12s extend from face 16 towards the axis 20 on non-radial lines.

FIG. 1 and other figures show two sets of notches, both similar, on the two annular edges 14 of the wheel.

In FIG. 1 and elsewhere are shown the feature that each notch is of considerable cross length across the face at least approximately half way.

In FIG. 1 and elsewhere is shown the feature that the side part of the notch 12s is of a length at least approximately the length of the cross part of the notch 12f.

The face parts 12f may extend across the wheel at acute angles relative to the axis of the wheel as shown in FIG. 1 and elsewhere or in directions parallel to the axis of the wheel as shown in FIG. 16 and elsewhere.

Figure 4:
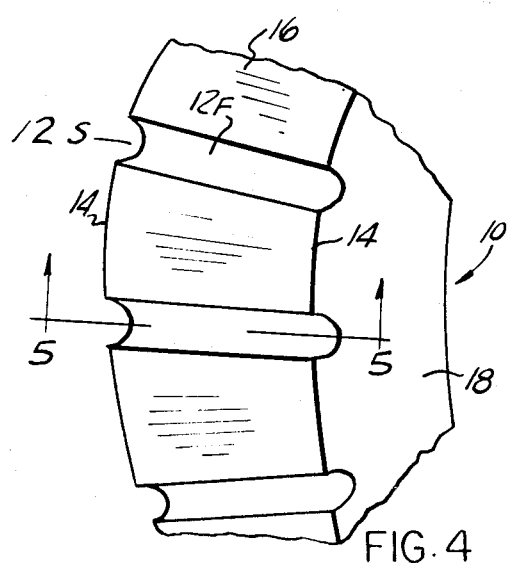
FIG. 4 shows a second embodiment in a fragmentary perspective view.
Figure 5:
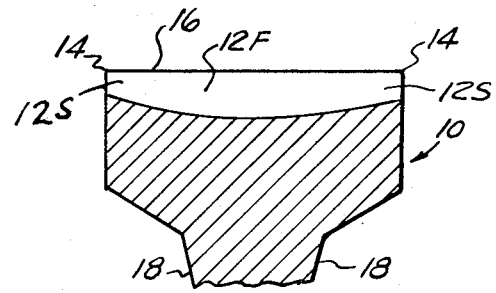
FIG. 5 is a transverse section view as if on line 5—5 of FIG. 4.

The face parts 12f may extend fully across the wheel face as shown in FIG. 4 and elsewhere, for example, or only part way across the wheel face as shown in FIG. 1 and elsewhere, for example.

The face of the wheel 16 may be flat as shown in FIG. 1, for example, or may be formed with a peripheral groove 22 as shown in FIG. 11 with such groove being between the two sets of notches and intersecting the face parts 12f.

While a variety of arrangements of notches are contemplated, it will be understood that the basic concept of the use of edge notches in a monolithic abrading wheel of a size and contour to function effectively as air scoops for air cooling is characteristic of all of the forms of wheels illustrated. Other forms may also be contemplated, and provided the notches are adequate in size and arrangement and contour to serve effectively for air scooping and thus for air cooling, the desired effects will be obtained regardless of the specific arrangement and contour of the notches.

CONCLUSION

Now having described the monolithic abrading wheel herein disclosed, characterized by the incorporation into the wheel of air scooping notches which function effectively for air cooling, reference should be had to the claims which follow.

I claim:

1. In an abrading wheel having a circumferential abrading face, an integral web of reduced thickness having an enlarged hub;
   the improvement comprising:
   a series of cooling, air scooping notches on both the annular edges defining the intersections of the abrading wheel face and the wheel sides; with the notches being relatively staggered, and having parallel side walls;

each notch being of considerable cross length, across the face, approximately halfway, i.e., between about 40 percent and about 75 percent across the face, each notch extending across the wheel face at a sharply acute angle relative to the axis of the wheel.

* * * * *